US005613112A

United States Patent [19]

Nagashima

[11] Patent Number: 5,613,112

[45] Date of Patent: Mar. 18, 1997

[54] MANAGEMENT OF RECORDABLE AREA FOR TOC (TABLE OF CONTENTS) AND RECORDING OR RECORDING/REPRODUCING APPARATUS FOR PERFORMING RECORDING ACTION BASED ON THE SAME TOC INFORMATION

[75] Inventor: Hideki Nagashima, Tokyo, Japan

[73] Assignee: Sony Corporation, Tokyo, Japan

[21] Appl. No.: 138,924

[22] Filed: Oct. 18, 1993

[30] Foreign Application Priority Data

Oct. 16, 1992 [JP] Japan .................................... 4-303223

[51] Int. Cl.$^6$ .............................. G06F 17/30; G06F 7/08

[52] U.S. Cl. .............................................. 395/616; 367/32

[58] Field of Search .................................... 395/600, 700, 395/525, 275, 425; 364/200, 300

[56] References Cited

U.S. PATENT DOCUMENTS

| | | | |
|---|---|---|---|
| 4,931,927 | 6/1990 | Ishiwata et al. | 364/300 |
| 4,939,598 | 7/1990 | Kulakowski et al. | 369/59 |
| 4,949,323 | 8/1990 | Yoshida | 369/32 |
| 5,040,110 | 8/1991 | Miki et al. | 369/59 |
| 5,093,820 | 3/1992 | Maeda et al. | 369/50 |
| 5,107,481 | 4/1992 | Miki et al. | 369/59 |
| 5,132,954 | 7/1992 | Kulakowski et al. | 369/48 |
| 5,148,418 | 9/1992 | Tsurushima | 369/32 |
| 5,214,631 | 5/1993 | Maeda et al. | 369/59 |
| 5,285,436 | 2/1994 | Moribe | 369/32 |
| 5,317,549 | 5/1994 | Maeda et al. | 369/32 |
| 5,341,359 | 8/1994 | Birukawa et al. | 369/107 |
| 5,426,624 | 6/1995 | Goto | 369/32 |

*Primary Examiner*—Thomas G. Black
*Assistant Examiner*—Cheryl Lewis
*Attorney, Agent, or Firm*—Limbach & Limbach LLP

[57] ABSTRACT

Recordable areas are recorded such that, if a recordable area exists on the outermost position of the disc, it is made into the head recordable area. The other recordable areas are linked from the inner peripheral side toward the outer peripheral side in order of address. With this method, the audio-recording is executed such that the segment division is minimized and the distance between segments is minimized. This makes it possible to shorten the segment access time and minimize the number of accessing operations required. In this way, sound-interruption and the deterioration of the shock-proof function in reproducing action can be prevented.

14 Claims, 6 Drawing Sheets

T4(2)
T5(1)
T4(1)
T1
T2
T4(4)
T4(3)
T5(2)

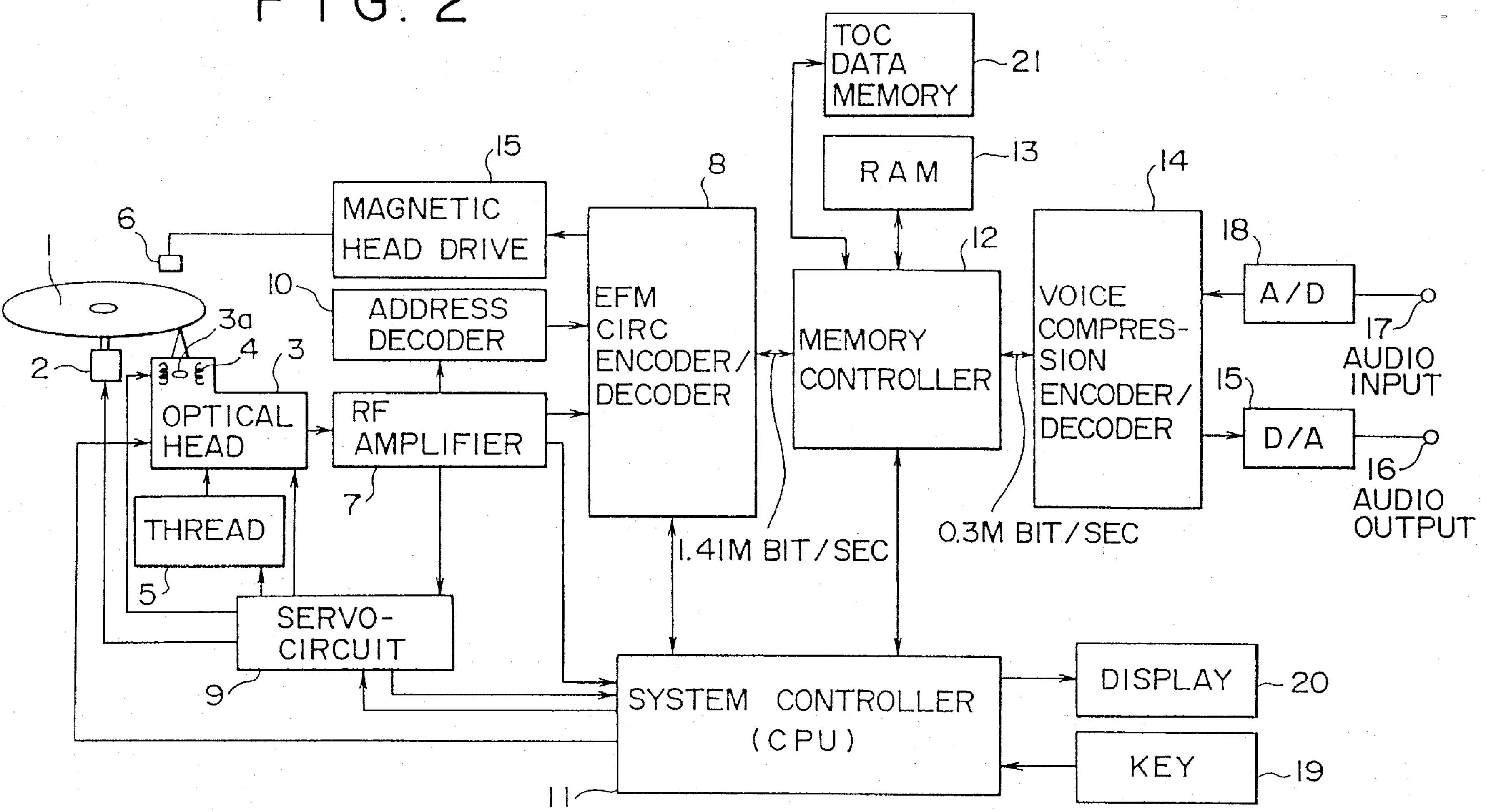
F I G. 2
TOC DATA MEMORY
21
RAM
13
MAGNETIC HEAD DRIVE
15
8
14
12
18
6
1
10
ADDRESS DECODER
EFM CIRC ENCODER/DECODER
MEMORY CONTROLLER
VOICE COMPRES-SION ENCODER/DECODER
A/D
17
AUDIO INPUT
3a
4
3
2
OPTICAL HEAD
RF AMPLIFIER
15
D/A
16
AUDIO OUTPUT
7
THREAD
1.41M BIT/SEC
0.3M BIT/SEC
5
SERVO-CIRCUIT
9
SYSTEM CONTROLLER (CPU)
DISPLAY
20
KEY
19
11

FIG. 3

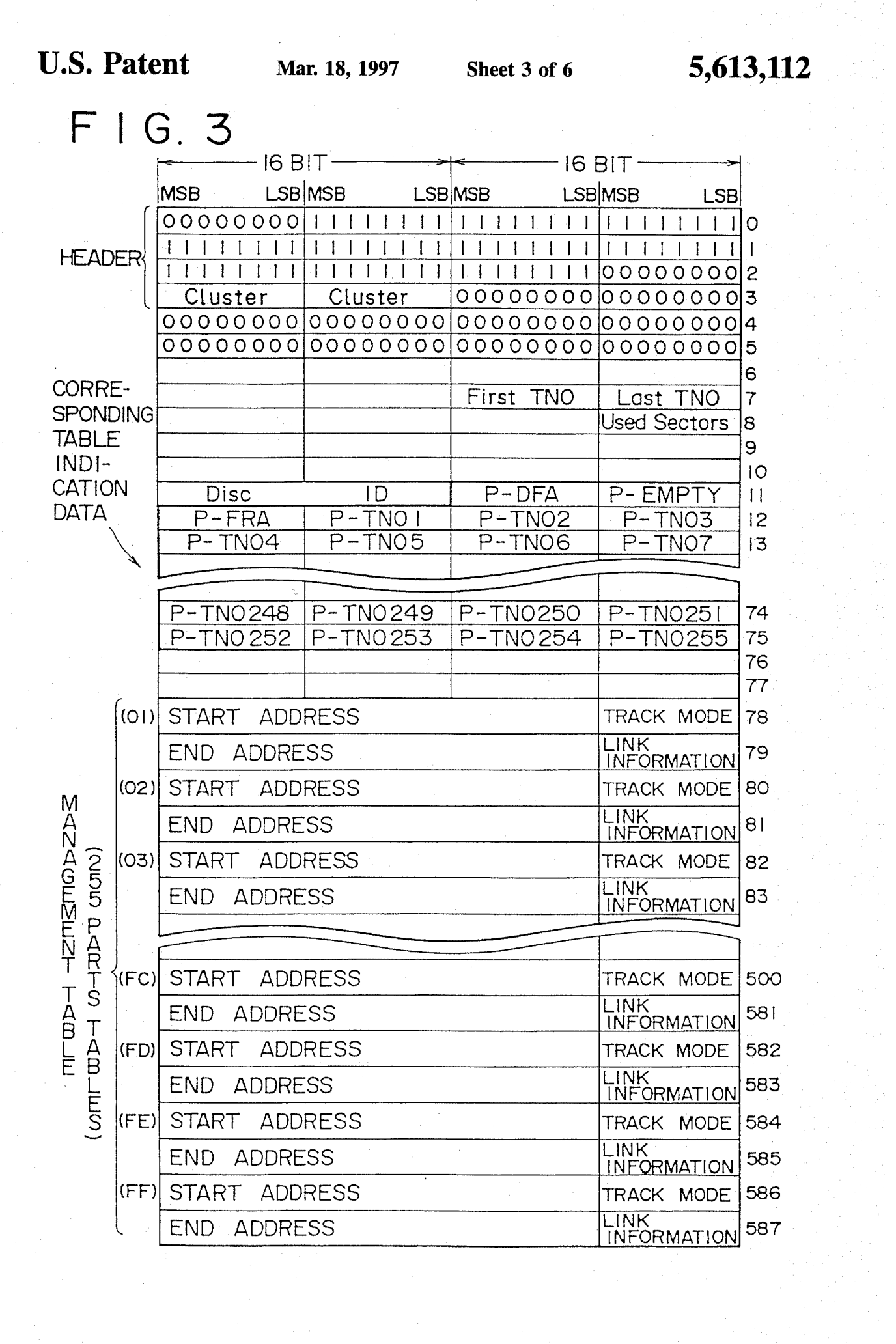

| MSB LSB | MSB LSB | MSB LSB | MSB LSB | |
|---|---|---|---|---|
| 00000000 | 11111111 | 11111111 | 11111111 | 0 |
| 11111111 | 11111111 | 11111111 | 11111111 | 1 |
| 11111111 | 11111111 | 11111111 | 00000000 | 2 |
| Cluster | Cluster | 00000000 | 00000000 | 3 |
| 00000000 | 00000000 | 00000000 | 00000000 | 4 |
| 00000000 | 00000000 | 00000000 | 00000000 | 5 |
| | | | | 6 |
| | | First TNO | Last TNO | 7 |
| | | | Used Sectors | 8 |
| | | | | 9 |
| | | | | 10 |
| Disc | ID | P-DFA | P-EMPTY | 11 |
| P-FRA | P-TNO1 | P-TNO2 | P-TNO3 | 12 |
| P-TNO4 | P-TNO5 | P-TNO6 | P-TNO7 | 13 |
| P-TNO248 | P-TNO249 | P-TNO250 | P-TNO251 | 74 |
| P-TNO252 | P-TNO253 | P-TNO254 | P-TNO255 | 75 |
| | | | | 76 |
| | | | | 77 |
| (01) START ADDRESS | | | TRACK MODE | 78 |
| END ADDRESS | | | LINK INFORMATION | 79 |
| (02) START ADDRESS | | | TRACK MODE | 80 |
| END ADDRESS | | | LINK INFORMATION | 81 |
| (03) START ADDRESS | | | TRACK MODE | 82 |
| END ADDRESS | | | LINK INFORMATION | 83 |
| (FC) START ADDRESS | | | TRACK MODE | 500 |
| END ADDRESS | | | LINK INFORMATION | 581 |
| (FD) START ADDRESS | | | TRACK MODE | 582 |
| END ADDRESS | | | LINK INFORMATION | 583 |
| (FE) START ADDRESS | | | TRACK MODE | 584 |
| END ADDRESS | | | LINK INFORMATION | 585 |
| (FF) START ADDRESS | | | TRACK MODE | 586 |
| END ADDRESS | | | LINK INFORMATION | 587 |

FIG. 6(a)
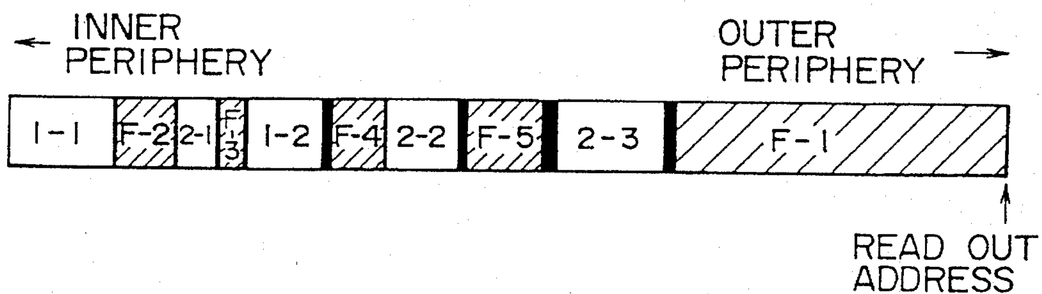
FIG. 6(b)
1-1 F-2 F-3 F-4 1-2 F-5 F-6 F-7 F-8 F-1
FIG. 7(a)
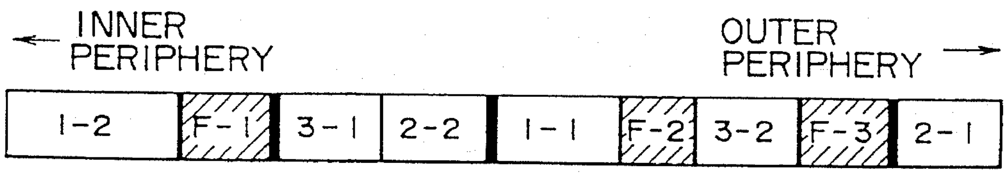
FIG. 7(b)
1-2 F-1 2-1 F-2 1-1 F-3 2-2 F-4 F-5

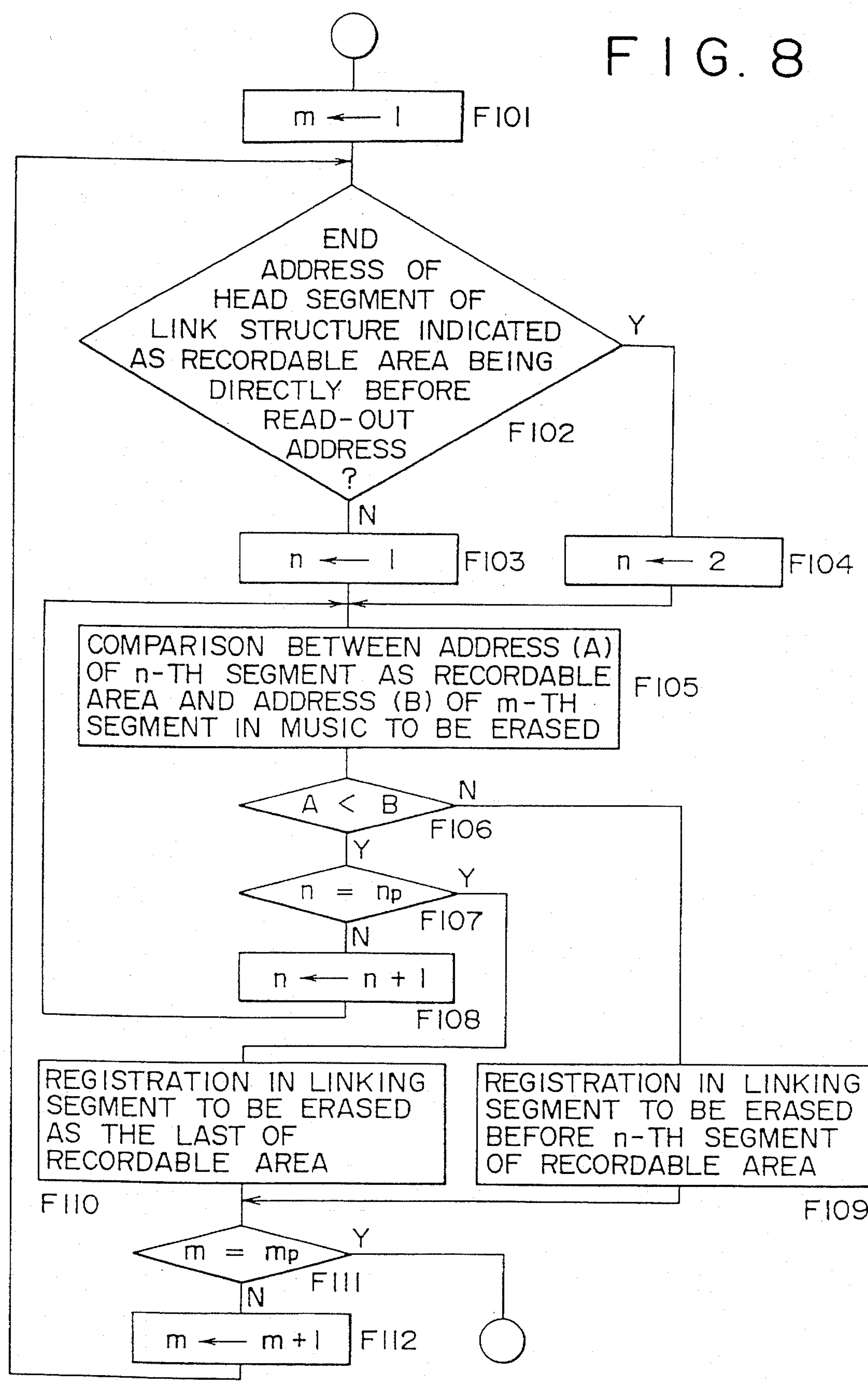
FIG. 8
m ← 1
F101
END ADDRESS OF HEAD SEGMENT OF LINK STRUCTURE INDICATED AS RECORDABLE AREA BEING DIRECTLY BEFORE READ-OUT ADDRESS ?
F102
Y
N
n ← 1
F103
n ← 2
F104
COMPARISON BETWEEN ADDRESS (A) OF n-TH SEGMENT AS RECORDABLE AREA AND ADDRESS (B) OF m-TH SEGMENT IN MUSIC TO BE ERASED
F105
A < B
F106
N
Y
n = np
F107
Y
N
n ← n + 1
F108
REGISTRATION IN LINKING SEGMENT TO BE ERASED AS THE LAST OF RECORDABLE AREA
F110
REGISTRATION IN LINKING SEGMENT TO BE ERASED BEFORE n-TH SEGMENT OF RECORDABLE AREA
F109
m = mp
F111
Y
N
m ← m+1
F112

MANAGEMENT OF RECORDABLE AREA FOR TOC (TABLE OF CONTENTS) AND RECORDING OR RECORDING/REPRODUCING APPARATUS FOR PERFORMING RECORDING ACTION BASED ON THE SAME TOC INFORMATION

BACKGROUND OF THE INVENTION

1. Field of the Invention

The present invention relates to a method of managing recordable areas with respect to a disc-like recording medium capable of recording data such as music data. The present invention also relates to a method of recording the data in the recordable areas.

2. Description of the Background Information

There have been known data rewritable disc media capable of recording music data by a user. Such a disc medium is provided with a data area (U-TOC: USER TABLE OF CONTENTS) for managing areas in which a data such as a music data has been already recorded and recordable areas. The management data is rewritten at the termination of each action such as recording, editing, overwriting or erasing.

For example, in voice-recording a certain program, an audio-recording apparatus retrieves recordable areas on the disc by means of the U-TOC, and records voice data as audio data therein.

Further, in the reproducing apparatus, the areas in which the program to be reproduced is recorded are discriminated by means of the U-TOC, and the reproducing action is made by access to the areas.

Incidentally, in the recordable disc media such as a magneto-optical disc, the random access can be performed extremely easily as compared with tape-like recording media such as a DAT (Digital Audio Tape) and a cassette tape. Accordingly, for example, one program is not necessarily required to be recorded on a continuous segment (the word "segment" means a track portion in which a physically continuous data is recorded), and may be discretely recorded on a plurality of segments. This is disclosed in, for example, U.S. patent application Ser. No. 945,488 filed on Sep. 16, 1992 (now issued as U.S. Pat. No. 5,388,903).

In particular, in such a system the data read out of a magneto-optical disc is once stored in a buffer RAM with a high speed writing rate and the read-out is performed from the buffer RAM with a low speed read-out rate. The data read out of the buffer RAM is demodulated as a reproducing audio signal. In this way, even if the read-out of the data from the magneto-optical disc is temporarily interrupted by access between segments, the reproducing sound according to the reproducing signal can be outputted without interruption. This is disclosed in, for example, U.S. Pat. No. 5,214, 631.

Accordingly, by repeating the recording/reproducing action in segments and a high access action (access action completed within the reproducible time due to the data storage amount generated by the difference between the writing rate and the reading rate in the buffer RAM), even if the track for one program is physically divided in a plurality of segments, there arises no problem in recording/reproducing the program.

For example, as shown in FIG. 1, a first music and a second music are continuously recorded in segments T1 and T2, respectively, and further, a fourth music and fifth music may be respectively recorded so as to be divided on the tracks as shown in segments T4(1)–T4(4) and T5(1)–T5(2). (In addition, FIG. 1 is a schematic representation. In actual practice, one segment is typically recorded in a spiral or radial manner extending from several tracks to several hundreds tracks.)

When the recording and the erasing of the program are repeated for the magneto-optical disc, empty areas tend to be irregularly generated on tracks due to the difference in the playing time of the program to be recorded or the playing time of the erased program; however, by executing the discrete recording described above, it is possible to record the program longer the erased program by utilizing the erased portion, and hence to eliminate the waste of the data recording areas by repeating the recording/erasing.

In addition, the data to be recorded is not necessarily limited to the "program", and may include voice signals. In this embodiment, however, the data block continuous in its content (recording data unit) will be expressed as the "program".

Of course, for such disc media, the audio-recording and the reproducing must be made as follows: namely, at the time of recording, the audio-recording must be continued while giving access to a plurality of segments as recordable areas; and at the time of reproducing, the access to the segments must be performed such that one program is reproduced so as to be correctly continued. Accordingly, the data for linking the segments (for example, T4(1) to T4(4)) and the data indicating the recordable area are kept as the U-TOG information. The U-TOG information is rewritten for each recording action or erasing action as described above. The recording/reproducing apparatus reads this U-TOC information and gives access of the head, thereby controlling the recording/reproducing action to be suitably performed.

Incidentally, when the program data is recorded, in the case that the recordable areas of a plurality of segments exist and the recording is carried out over a plurality of segments, if these segments (recordable areas) are physically apart from each other, there occurs a problem that the interruption of the reproduced sound is generated or the shock-proof function is deteriorated in reproducing.

The reason for this is that a prolonged time is required for the access between the segments for reproduction. During this time, the read-out of the data from the disc is interrupted. Namely, while the output of the reproduced sound is performed insofar as the reproducing data is stored in the buffer RAM even in the access period in which the read-out of the data from the disc is interrupted, the reproducing data in the buffer RAM becomes empty when the access takes a lot of time, thus causing the interruption of the sound.

Further, in the case that the tracking is shifted by vibration, since the data is stored in the buffer RAM by a content for a specified time, the reproduced sound generated from the reproducing signal can be outputted without interruption for a time required to recover proper tracking. However, when the access takes a lot of time and thereby the data stored in the buffer RAM is consumed, there occasionally occurs a case that the sound cannot be continuously outputted for the time required to recover the tracking. In other words, the shock-proof function is deteriorated.

OBJECT AND SUMMARY OF THE INVENTION

Taking the above circumstances into consideration, the present invention has been made, and an object of the present invention is to provide a managing method or a recording method for recordable areas, which is capable of preventing the interruption of the reproduced sound in reproducing, and also preventing the lowering of the shock-proof function.

According to the present invention, there is provided a recording or recording/reproducing apparatus for performing the recording action for one continuous segment or plural discrete segments of a disc recording medium which has segment managing data for managing the segments.

The above segment managing data includes a managing table and corresponding table indication data, wherein the managing table includes a plurality of parts tables.

The parts table includes a start address, an end address and link information for the already recorded areas and recordable area of the data. The link information records the address on the managing table of the parts table corresponding to the next segment to be linked.

The corresponding table indication data records the address on the managing table of the head parts table of one or plural parts tables corresponding to the recordable areas on the managing table for one or plural recordable areas.

In the above recording or recording/reproducing apparatus, the managing method for the recordable areas in the disc recording medium is described below.

When a plurality of recordable areas are linked within the managing table through the link information by rewriting of the segment managing data, in the case that the segment positioned on the outermost periphery is a recordable area of the disc-like recording medium is a recordable area, the recordable area is taken as the head recordable area. In this case, the recordable areas positioned on the inner peripheral side of the disc-like recording medium are sequentially linked. On the other hand, in the case that the segment positioned on a outermost periphery is not the recordable area, the recordable areas are sequentially linked from the inner peripheral side of the disc-like recording medium.

Further, in the recording method in a recording apparatus for controlling the recording action by reading the recording data recorded in the recording medium and the segment managing data for performing the management for the recordable areas for reference, the positions of recordable areas are confirmed from the segment management table. In the case that the segment positioned on the outermost periphery in the recordable areas of the disc-like recording medium is a recordable area, the recording action is started from the recordable area positioned on the outermost periphery, and then the recording action is sequentially executed from the recordable area positioned on the inner peripheral side of the disc-like recording medium.

In addition, in the case that the segment positioned on the outermost periphery is not a recordable area, the recording action is sequentially executed from the recordable areas positioned on the inner peripheral side of the disc-like recording medium.

With this recording, the sequential segments of the recordable areas are managed at to be at positions as close to each other as possible. This makes it possible to shorten the access time for giving the access between the segments (that is, the time when the read-out of the data from the disc is interrupted) in reproducing the program data and hence to prevent the interruption of reproducing sound and the deterioration of the shock-proof function.

In addition, in the case that the segment positioned on the outermost periphery of the disc is a recordable area, the segment is commonly considered to be sufficiently long, that is, there is a high possibility that the segment will not be required to be divided in recording the program.

Consequently, since the link state of the recordable areas is made such that, when the segment positioned on the outermost periphery is a recordable area, it is made the head segment and the others are sequentially linked from the inner peripheral side, the common recording action is made on the recordable areas in the order linked in the segment managing data. This makes it possible to minimize the possibility that the continuous data is recorded in the segments being physically far apart from each other.

BRIEF DESCRIPTION OF THE DRAWINGS

FIG. 2 is a block diagram of a recording/reproducing apparatus to which an embodiment of the present invention is applied;

FIG. 3 is an explanatory view of a data structure of USER-TOC information read by the recording/reproducing apparatus of the embodiment;

FIGS. 6(*a*) and 6(*b*) are explanatory views of the managing method for recordable areas in the embodiment;

FIGS. 7(*a*) and 7(*b*) are explanatory views of the managing method for recordable areas in the embodiment; and FIG. 8 is a flow chart showing the managing method for recordable areas in the embodiment.

DETAILED DESCRIPTION OF THE PREFERRED EMBODIMENTS

Figure 1:
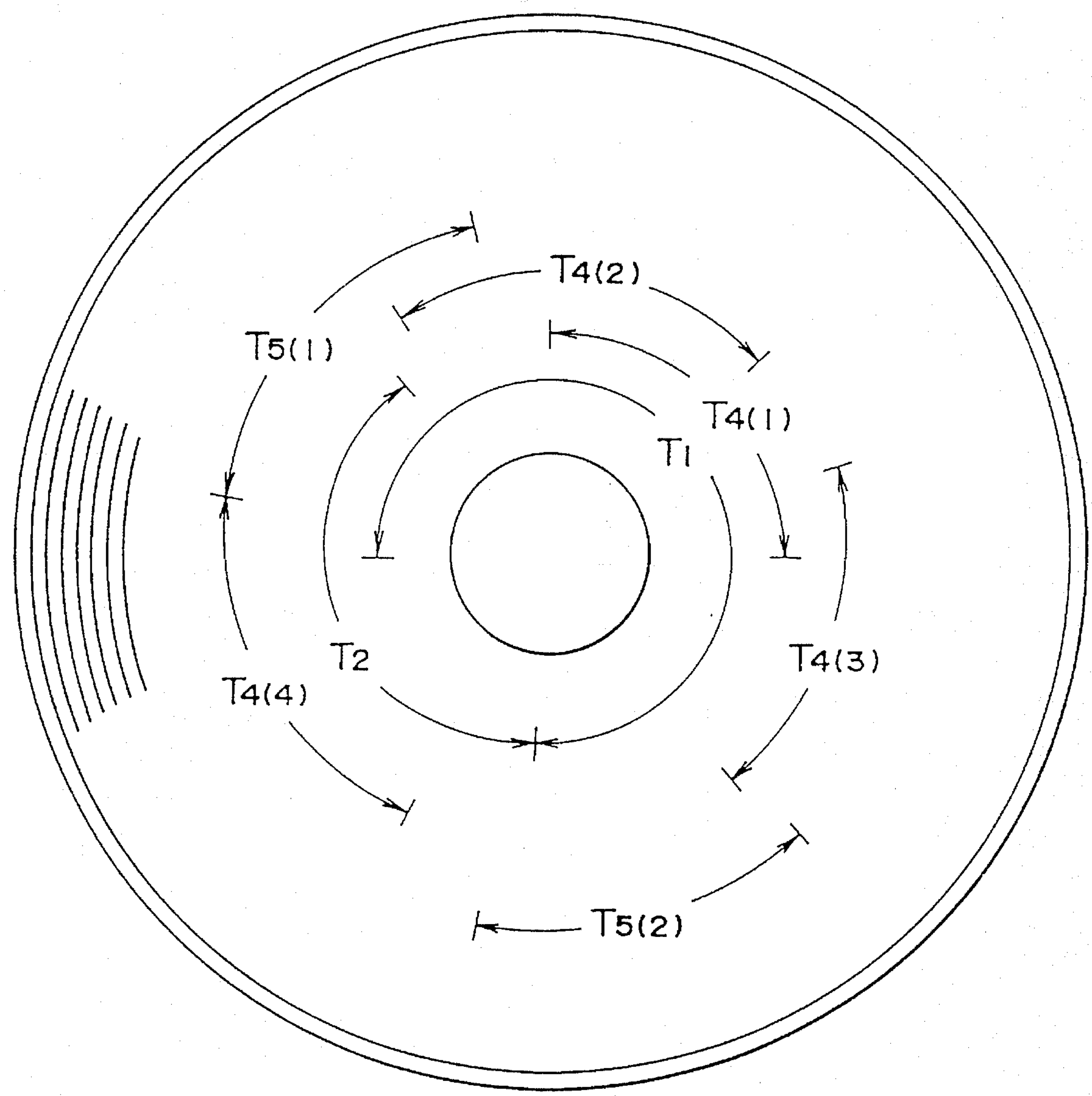
FIG. 1 is an explanatory view for discrete recording on a recording medium.

Hereinafter, embodiments of the present invention will be described. First, the construction of a recording/reproducing apparatus adopting a managing method and a recording method for recordable areas according to an embodiment will be described with reference to FIG. 1. Subsequently, a segment managing data written in a magneto-optical disc of the recording/reproducing apparatus as U-TOC information will be described with reference to FIGS. 3 and 4. Finally, the action of this embodiment will be described.

FIG. 2 is a block diagram of the recording/reproducing apparatus using a magneto-optical disc as a recording medium.

In FIG. 2, reference numeral 1 indicates a magneto-optical disc in which, for example, a plurality of programs as audio data, for example voice data, are recorded, and which is rotated by a spindle motor 2. Reference numeral 3 is an optical head for irradiating a laser beam to the magneto-optical disc 1 in recording/reproducing, wherein a high level laser for heating a recording track up to the Curie temperature is outputted in recording, and a relatively low level laser for detecting a data from the reflection light by the magnetic Kerr effect is outputted in reproducing.

For this reason, the optical head 3 is mounted with a laser diode as a laser outputting means, an optical system including a deflection beam splitter and an objective lens, and a detector for detecting the reflection light. The objective lens 3*a* is held by a bi-axial mechanism 4 so as to be displaced in the disc radial direction and the direction of becoming close to/apart from the disc. The whole of the optical head 3 is movable in the disc radial direction by a thread mechanism 5.

Reference numeral 6 indicates a magnetic head for applying a magnetic field modulated by the supplied data to the magneto-optical disc 1, and which is disposed at the position opposed to the optical disc 3 while putting the magneto-optical disc 1 therebetween.

In reproducing action, the information detected from the magneto-optical disc 1 by means of the optical head 3 is supplied to an RF amplifier 7. The RF amplifier 7 computes the supplied information, to extract a reproducing RF signal, a tracking error signal, a focus error signal, an absolute positional information (absolute positional information recorded in the magneto-optical disc 1 as a pre-groove (wobbling groove)), address information, sub-code information, a focus monitor signal and the like. The extracted reproducing RF signal is supplied to an encoder/decoder unit 8. The tracking error signal and the focus error signal are supplied to a servo circuit 9, and the address information is supplied to an address decoder 10 to be demodulated. In addition, the focus monitor signal is supplied to a system controller 11 which is, for example, constituted of a micro-computer.

The servo circuit 9 generates each servo drive signal on the basis of the supplied tracking error signal and the focus error signal. Further, a track jump command, a seek command, and rotational speed detection information from the system controller 11, to control the bi-axial mechanism 4 and the thread mechanism 5 for performing the focus control and the tracking control, or to control the spindle motor 2 to be in constant angular velocity (CAV) or to be in constant linear velocity (CLV).

The reproducing RF signal is subjected to the decoding such as EFM (Eight-Fourteen Demodulation) or CIRC (Cross Interleave Reedsolomon Code) at the encoder/decoder unit 8, and is once written in a buffer RAM 13 by a memory controller. In addition, the read-out of data from the magneto-optical disc 1 by means of the optical head 3 and the transfer of the reproducing data from the optical head 3 to the buffer RAM 13 are performed at 1.41 Mbit/sec.

The data written in the buffer RAM 13 is read out with such a timing that the transfer of the reproducing data is performed at 0.3 Mbit/sec, to be thus supplied to an encoder/decoder unit 14. The supplied data is subjected to the reproducing signal processing such as the decoding with respect to the audio data compression, and is converted to an analog signal by a D/A (Digital to Analog) converter 15. The analog signal is supplied to a specified amplifier circuit by way of a terminal 16, to be outputted for reproducing. For example, it is outputted as a left channel or a right channel audio signal.

Figure 5:
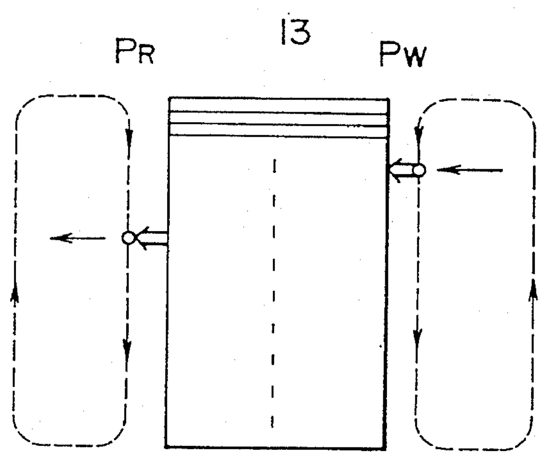
FIG. 5 is an explanatory view of a writing/reading action in a buffer RAM in the recording/reproducing apparatus of the embodiment.

The writing in and reading from the buffer RAM 13 are respectively designated by a writing pointer PW and a reading pointer PR, to be managed as described below. As shown in FIG. 5, the writing pointer PW or the reading pointer PR designates an address within a memory area of the buffer RAM 13, and which is replaced to the next address position for each writing or reading action. As shown in the dashed line of FIG. 5, either of the pointers PW and PR is replaced in such a ring structure that it reaches the final address, and thereafter is replaced to the head address. The writing of the data read out of the magneto-optical disc 1 to the buffer RAM 13, that is, the replacement of the writing pointer PW is performed at 1.41 Mbit/sec (intermittently) as described above. On the other hand, the action of reading a data from the buffer RAM 13 for supplying the data to the encoder/decoder unit 14, that is, the replacement of the reading pointer PR is performed at 0.3 Mbit/sec.

Accordingly, if the memory capacity of the buffer RAM 13 is 1 Mbit, the full capacity of the data storage in the buffer RAM is made after an elapse of 0.9 sec since the starting of the reproducing. Accordingly, the data output is possible for 3 sec even if the data is not supplied from the magneto-optical disc 1, thereby making it possible to prevent the interruption of the reproducing signal or the reproducing sound. For example, if the data output for about 3 sec is possible, the reproducing output can be sufficiently continued even during access.

The absolute positional information obtained by decoding the pre-groove information or the address information recorded as data, which is outputted from the address decoder 10, are supplied to the system controller 11 through the encoder/decoder unit 8, to be thus used as each control action.

A lock detection signal from a PLL (Phase Locked Loop) circuit for generating a bit clock for the recording/reproducing action, and a monitor signal in the state being lack of a frame synchronous signal of the reproducing data (right channel, left channel) are supplied to the system controller 11.

When the recording action is executed on the magneto-optical disc 1, the recording signal (analog audio signal) supplied to a terminal 17 is converted in a digital signal by an A/D (Analog to Digital) converter 18, and then supplied to the encoder/decoder unit 14 to be encoded for audio data compression. The recorded data compressed by the encoder/decoder unit 14 is once written in the buffer RAM 13 by the memory controller 12, and is read out with a specified timing to be supplied to the encoder/decoder unit 8. The recorded data is subjected to the encoding such as CIRC (Cross-Interleave Reedsolomon Code), EFM (Eight-Fourteen Modulation) at the encoder/decoder unit 8, and then supplied to a magnetic head drive circuit 15.

The magnetic head drive circuit 15 supplies a magnetic head drive signal to the magnetic head 6 according to the encoded recording data, thus allowing the magnetic head 6 to apply a magnetic field of N or S to the magneto-optical disc 1. In this case, the system controller 11 supplies a control signal to the optical head 3 so as to output a laser beam in the recording level.

Reference numeral 19 indicates an operational inputting unit provided with keys to be operated by the user, and reference numeral 20 indicates a display unit constituted of, for example, a liquid crystal display. The operational inputting unit 19 is provided with a sound-recording key, reproducing key, stopping key, music selecting key, quick traverse/rewinding key and the like to be operated by the user.

Reference numeral 21 indicates an RAM for holding TOC information in the magneto-optical disc 1 (hereinafter, referred to as TOC memory). At the time when the magneto-optical disc 11 is loaded or directly before the recording or reproducing action is performed, the system controller 11 drives the spindle motor 2 and the optical head 3, to extract the data in a TOC area set, for example, on the innermost peripheral side of the magneto-optical disc 1. The TOC information supplied to the memory controller 12 through the RF amplifier 7 and the encoder/decoder unit 8 is stored in the TOC memory 21, after which the system controller 11 uses the TOC information for controlling the recording/reproducing action to the magneto-optical disc 1.

In particular, in such a recordable disc medium, a segment managing data enabling one program to be recorded/reproduced as one or plural-divided segments is recorded. Namely, the USER-TOC area (hereinafter, referred to as U-TOC) for rewriting the contents according to the recording or erasing of the data for managing recordable areas is provided. The USER-TOC area has such a data structure as shown in FIG. 3.

The U-TOC is constituted of, for example, data areas of 4 byte×587, and has a header with a synchronous pattern composed of one byte data of all 0 or all 1 provided on the head position for indicating the U-TOC areas.

Further, at each specified position, the data such as the music number in the first recorded program (First TNO), the music number in the last program (Last TNO), the sector usage status or the disc ID is recorded. In addition, there is prepared an area in which each corresponding table indication data (P-DFA to P-TNO225) for allowing each recorded program to correspond to a management table described later is recorded.

On the other hand, as the management table, 255 pieces of parts tables from (01) to (FF) are provided. Each parts table is able to record a start address, an end address of a certain segment, the mode information of the segment (track), and the link information for showing the parts table in which, when the segment is sequentially connected to another segment, the start address and the end address of the segment to be linked are recorded.

The mode information of the track records the information of determining whether or not the segment is set in the over-write prohibition or data copy prohibition, whether or not it is related to the audio, whether it is monophonic or stereophonic, and the like. The link information designates a parts table to be linked by the numbers (01) to (FF) given to parts tables.

Namely, in the management table, one parts table expresses one segment. For example, a program constituted of three segments linked to each other is managed in the segment positions by three parts tables linked through the link information. Accordingly, the numbers (01) to (FF) of the parts tables may be used as segment numbers.

Each parts table from (01) to (FF) in the management table indicates the content of the segment according to the corresponding table indication data (P-DFA to P-TN0255).

P-DFA (Pointer for the start address of the Defective Area) indicates a defect area on the magneto-optical disc 1, and designates one parts table or the head parts table within a plurality of parts tables which indicates a track portion (segment) as a defective area due to damage. Namely, in the case that the defect segment exists, either of (01) to (FF) is recorded in the corresponding table indication table P-DFA, and the defect segment is indicated in the corresponding parts table by the start address and end address. Further, in the case that another defect segment exists, another parts table is designated by the link information in the parts table, and the defect segment is indicated in the parts table. In the case that the other defect segment ceases to exist, the link information is made to be, for example, [(00)] which indicates that there is no link thereinafter.

P-EMPTY (Pointer for the first Empty slot on the parts table) indicates the head parts table of one or plural unused parts tables in the management table. In the case that an unused parts table exists, either of (01) to (FF) is recorded as the corresponding table indication data P-EMPTY. In the case that plural unused parts tables exist, each parts table is sequentially indicated from the parts tables designated by the corresponding table indication data P-EMPTY through the link information, and all unused parts tables are linked on the management table.

P-FRA (Pointer for the start address of the freely recordable area) indicates each recordable area (including erasing area) of the data on the magneto-optical disc 1, and which designates the head parts table in one or plural parts tables in which the track portion (segment) as the recordable area is indicated. Namely, in the case that a recordable area exists, either of (01) to (FF) is recorded in the corresponding table indication data P-FRA, and the segment as the recordable area is indicated in the parts table corresponding thereto by the start address and end address. Further, in the case that such segments exist in plural numbers, that is, plural parts tables exist, each parts table is sequentially designated up to the parts table in which the link information is [(00)].

For example, in the case of the magneto-optical disc with no record and no defect, the parts table (01) is designated on the basis of the corresponding table indication data by P-FRA, and the recordable innermost peripheral address is indicated as the start address of the table and the outermost peripheral address is designated as the end address.

Since the other parts tables are not used, the parts table (02) is designated by the corresponding table indication data P-EMPTY. Further, the parts table (03) is designated by the link information of the parts table (02), and the parts table (04) is designated by the link information of the parts table (03), which is continued up to the parts table (FF). In this case, the link information of the parts table (FF) is made to be [(00)] which indicates that the linking does not exist no longer after this.

Figure 4:
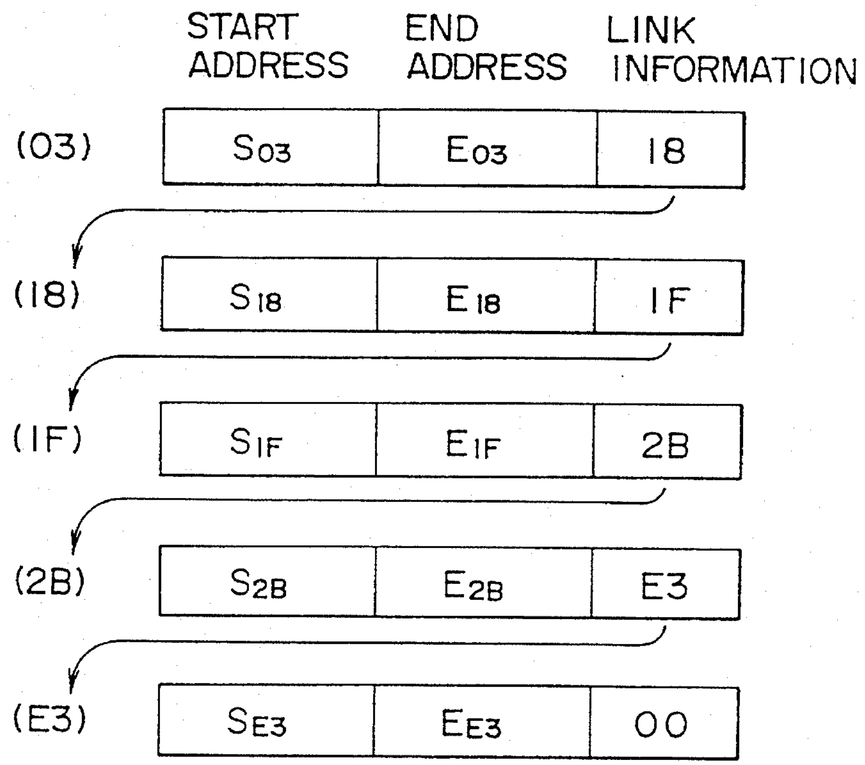
FIG. 4 is an explanatory view of the segment managing state due to the corresponding table indication data and the parts tables.

FIG. 4 typically shows the management state for segments which become recordable areas by parts tables. This indicates such a state that, when the segments (0), (18), (1F), (2B) and (E3) are taken as recordable areas, this state is expressed by the link of the parts tables (03), (18), (1F), (2B), and (E3) following the corresponding table indication data P-FRA. In addition, the management state for the above defect areas or the unused parts tables is similar to the management state described above.

P-TNO1 to P-TN255 indicate respective programs recorded on the magneto-optical disc 1. For example, the corresponding table indication data P-TNO1 designates the parts table indicating the head segment (in order of time) of one or plural segments in which the data of the first music is recorded.

For example, in the case that the program as the first music is recorded while not divided on the different tracks of the disc (namely, with one segment), the recording area for the first music is recorded as the start address and end address in the parts tables indicated by the corresponding table indication data P-TNO1.

Further, for example, in the case that the program as the second music is recorded discretely in a plurality of segments on the disc, each segment is designated according to the order of time for indicating the recorded positions of the program. Namely, from the parts table designated in the corresponding table indication data P-TNO2, the other parts tables are sequentially designated in the order of time by the link information. The parts tables are sequentially linked up to the parts table in which the link information becomes [(00)] (in the same form as shown in FIG. 4). Thus, all segments in which the data constituting the second music is sequentially designated and stored. Accordingly, by use of the U-TOC data, in reproducing the second music or performing the overwrite to the area of the second music, it is possible to take off the continuous music information from the discrete segments or perform the recording effectively utilizing the record area by the access of the optical head 3 and the magnetic head 6.

In a recording/reproducing apparatus with respect to the magneto-optical disc 1 in which such U-TOC data is recorded, the management for the recording areas on the disc is performed using the U-TOC data read from the TOC memory 21, to control the recording/reproducing action.

Of course, after the recording, erasing and editing of a certain program are performed, and the data recorded area and the recordable areas are changed, the U-TOC data is rewritten according to this processing.

Hereinafter, as the managing method for the recordable areas in this embodiment, the link formation action for the recordable areas executed in rewriting of such U-TOC data will be described with reference to FIGS. 6 to 8.

FIG. 6(*a*) typically shows the usage of segments on the disc in which two music are recorded, Here, the first program is constituted of two segments [1-1] and [1-2); and the second music is constituted of three segments [2-1], (2-2] and [2-3]. And, five segments [F-1] to [F-5] remain as recordable areas. In addition, the end address of the segment [F-1] lies directly before the read-out address of the disc.

The segments [F-1] to [F-5] are managed in the U-TOC to be linked in the form as shown in FIG. 4, that is, in the order of [F-1], [F-2], [F-3], [F-4] and [F-5]. For example, in the case that the third music is to be recorded on the disc as shown in FIG. 6(*a*), the recording is first made in the segment (F-1), and is continued by the access in the order of the linking.

Now, when the erasing of the second music is executed in the state as shown in FIG. 6(*a*), the segments [2-1], [2-2] and [2-3] become the recordable areas after being erased. Accordingly, the data regarding the linked recordable area in the corresponding table indication data P-FRA in the U-TOC must be rewritten. At this time, in this embodiment, the management is made by forming a new link structure by linking the segments newly made in the recordable areas to the last segment (F-5) of the existing recordable area.

Namely, if the segment positioned on the outermost periphery of the disc is the recordable area, it is headed, and the other segments are linked from the inner peripheral side of the disc in order of the address. Accordingly, as shown in FIG. 6(b), the U-TOC data is rewrote such that the recordable areas are linked and managed in order of [F-1], [F-2], . . . [F-8].

As described above, the management for the recordable areas is made such that, if the recordable area is positioned on the outermost periphery, it is headed, and the other recordable areas are sequentially linked from the inner peripheral side. Consequently, the possibility that the program to be recorded after that is divided in a plurality of segments is minimized, and also even if being divided, the program is continuously recorded in the relatively close segments, This makes it possible to reduce the access time required for reproducing and to prevent the deterioration of the shock-proof function. Namely, since the recording action is commonly performed sequentially from the inner peripheral side, the recordable area on the outermost peripheral side of the disc is often the largest recordable area, in which the possibility of recording one music in a plurality of segments is made small. For this reason, the recordable area positioned on the outermost peripheral side is headed. As for the other recordable areas, by linking them from the inner peripheral side in order of address, the access distance is minimized.

FIG. 7(*a*) typically shows the usage of segments in the disc in which three music are recorded. This example shows the case that the outermost peripheral segment is not a recordable area.

Here, the first program is constituted of two segments [1-1] and [1-2]; the second program is constituted of two segments [2-1] and [2-2]; and the third program is constituted of two segments [3-1] and [3-2]. And, three segments [F-1] to [F-3] remain as the recordable areas, which are linked and managed in the U-TOC in the order of [F-1], [F-2] and [F-3].

When the erasing for the program of the second music is executed in such a state as shown in FIG. 7(*a*), the segments [2-1] and [2-2] are made into the recordable areas after the erasure. Accordingly, the data regarding the linked recordable areas in the corresponding table indication data P-FRA in the U-TOC is rewritten by making a new link structure.

In this case, although the segment [2-1] on the outermost periphery in FIG. 7(*a*) newly appears as the recordable area, the area once recorded and thereafter returned to the recordable area is not made in the first segment if it is positioned on the outer periphery. The reason for this is the low probability that a large recordable area (not requiring the division of the music) is formed on the outermost periphery is low.

In the case that the recordable area does not exist while including the above case, each recordable area is linked from the inner peripheral side of the disc in the order of address. Accordingly, the U-TOC data is rewritten such that the recordable areas are linked and managed in order of [F-1], [F-2], . . . [F-5] as shown in FIG. 7(*b*). Thus, in the recording action after that, the recording is executed such that the access time in reproducing is shortened.

In addition, by erasing of the second music as shown, in FIG. 7(*b*), the third music in FIG. 7(*b*) will then be managed as the second music.

The processing of the system controller 11 of realizing such a managing method as shown in FIGS. 6(*a*), 6(*b*), 7(*a*) and 7(*b*) is shown in the flow chart of FIG. 8. In addition, the processing executed in erasing is shown.

In executing the erasing, the number mp of segments of the erased program and the number np of segments of the recordable area directly before erasing are incorporated.

First, the variable m is set to be m=1 (F101), and subsequently, it is judged whether or not the segment designated at the head of the link structure as the recordable area is the segment positioned on the outermost periphery of the disc (F102). Namely, the end address of the segment is compared with the read-out address of the disc, and if the end address lies directly before the read-out address, the segment is determined to be the outermost periphery segment, and it is determined that the recordable area exists on the outermost periphery. In addition, the read-out address is recorded in the TOC area of the disc.

If the first segment as the recordable area is the outermost peripheral segment of the disc, as shown in FIG. 6(*a*), the variable n is set to be n=2 (F104). If the outermost segment of the disc is not the recordable area, as shown in FIG. 7(*a*), the variable n is set to n=1 (F105).

Thus, the address A (for example, start address) of the n-th segment linked as the recordable area is compared with the address B (start address) of the m-th segment of the music to be erased (F105). Namely, first, the recordable area positioned in the innermost peripheral side of the disc is compared with the position of the first segment to be erased.

If the segment to be erased is positioned on the outer peripheral side from the recordable area on the innermost peripheral side of the disc (A<B), the value of n is increased (F108), and it is sequentially compared with each linked recordable, that is, each recordable area sequentially positioned toward the outer periphery. Thus, the m-th segment of the music to be erased is linked as the segment directly before the n-th recordable area at the time of A>B, which is made in a new recordable area (F106→F109).

If n=np while A>B is not satisfied, that is, if A>B is not satisfied even by comparing the segment to be erased in address with all the recordable areas, the segment to be erased is to be positioned on the outermost peripheral side in the recordable areas, so that the segment is linked as the last segment in the recordable areas (F107→F109).

With the above processing, the segment which is erased and newly made into a recordable area is incorporated such that each recordable area is linked from the inner peripheral side of the disc in order towards the outer peripheral side.

If m=mp is not satisfied (F111), the segment to be erased exists, so that the variable m is increased and the process is returned in the step F102, wherein the next segment to be erased is similarly judged in its position to be incorporated in the link structure, and the segment is linked at the specified position.

The above processing is made for all the segments to be erased (until m=mp), thus completing the processing. The erased segments of the music are incorporated in the link structure as the recordable areas wherein the link order of the recordable area is sequentially formed from the inner peripheral side except that the segment positioned on the outermost peripheral side is made in the first recordable area.

Since the sound-recording action is commonly executed such that each recordable area is selected in the link order, the segment division is small by the information on the recordable area managed according to the above method. Also subsequent recording can be executed in which the distance between segments is small.

In addition, without such management, similarly, the recording capable of minimizing the segment division and the between-segment distance can be executed by judging the segment which is made in the recordable area in recording and controlling the recording using the recordable area positioned on the outermost periphery of the disc firstly and then the recordable areas sequentially positioned from the inner peripheral side. In addition, in this embodiment, the present invention has been applied to the recording/reproducing apparatus; however, it may be applied to a recording-dedicated apparatus. Further, the present invention may be applied to a recording apparatus corresponding to the rewritable optical disc, other than the magneto-optical disc.

What is claimed is:

1. A recording/reproducing apparatus for recording information on a recordable disc medium having an inner periphery, an outer periphery, and at least one recordable area, the apparatus comprising:

storing means for storing addresses of recordable areas and sequential link information which provides an order for the recordable areas starting from a first recordable area;

determining means for determining whether an area at the outer periphery of the disc medium is a recordable area; and control means for changing the sequential link information in the storing means so that when the determining means determines that the area at the outer periphery is a recordable area, then the recordable area at the outer periphery is the first recordable area.

2. The apparatus according to claim 1, wherein the storing means is a random access memory.

3. The apparatus according to claim 1, wherein when the determining means determines that the area at the outer periphery is a recordable area and the recordable area at the outer periphery is made the first recordable area by the control means, then the control means further changes the sequential link information so that the recordable areas after the first recordable area are ordered starting from a recordable area nearest the inner periphery and proceeding toward the outer periphery of the disc medium.

4. The apparatus according to claim 1, wherein, when the determining means determines that the area at the outermost periphery of the disc medium is not a recordable area, then the control means changes the sequential link information so that the recordable area nearest the inner periphery is the first recordable area and the order of recordable areas proceeds toward the outer periphery of the disc medium.

5. The apparatus according to claim 1, wherein the determining means for determining whether an area at the outer periphery of the disc medium is a recordable area whenever an erasing or overwrite operation is performed.

6. The apparatus according to claim 1, further comprising:

recording means for recording data on the disc medium starting from the first recordable area, and proceeding in the order of the sequential link information.

7. In combination, a recordable disc medium and a recording/reproducing apparatus for recording information on the recordable disc medium having an inner periphery, an outer periphery, and at least one recordable area, the apparatus comprising:

storing means for storing addresses of recordable areas and sequential link information which provides an order for the recordable areas starting from a first recordable area;

determining means for determining whether an area at the outer periphery of the disc medium is a recordable area; and control means for changing the sequential link information in the storing means so that when the determining means determines that the area at the outer periphery is a recordable area, then the recordable area at the outer periphery is the first recordable area; and the recordable disc medium further comprises:

a table of contents for storing the addresses of recordable areas and the sequential link information.

8. The combination according to claim 7, wherein the table of contents also stores addresses of recorded areas and sequential recorded area link information which provides an order for the recorded areas starting from a first recorded area.

9. The combination according to claim 8, wherein the addresses of recordable areas, the addresses of recordable areas, the sequential recorded area link information and the link information for recordable areas in the table of contents is updated whenever an erasing or overwrite operation is performed.

10. The combination according to claim 7, wherein when the determining means determines that the area at the outer periphery is a recordable area and the recordable area at the outer periphery is made the first recordable area by the control means, then the control means further changes the sequential link information so that the recordable areas after the first recordable area are ordered starting from a recordable area nearest the inner periphery and proceeding toward the outer periphery of the disc medium.

11. The combination according to claim 7, wherein, when the determining means determines that the area at the outermost periphery of the disc medium is not a recordable area, then the control means changes the sequential link information so that the recordable area nearest the inner periphery is the first recordable area and the order of recordable areas proceeds toward the outer periphery of the disc medium.

12. A method for recording information on a recordable disc medium having an inner periphery, an outer periphery, and at least one recordable area, the method comprising the steps of:

storing addresses of recordable areas and sequential link information which provides an order for the recordable areas starting from a first recordable area;

determining whether an area at the outer periphery of the disc medium is a recordable area; and changing the sequential link information in the storing means so that when it is determined that the area at the outer periphery is a recordable area, then the recordable area at the outer periphery is the first recordable area.

13. The method according to claim 12, wherein when it is determined that the area at the outer periphery is a recordable area and the recordable area at the outer periphery is made the first recordable area, then the sequential link information is further changed so that the recordable areas after the first recordable area are ordered starting from a recordable area nearest the inner periphery and proceeding toward the outer periphery of the disc medium.

14. The method according to claim 12, further comprising the step of:

changing the sequential link information is changed so that when it is determined that the area at the outermost periphery of the disc medium is not a recordable area, then the recordable area nearest the inner periphery is the first recordable area and the order of recordable areas proceeds toward the outer periphery of the disc medium.

* * * * *